United States Patent [19]
Brane et al.

[11] Patent Number: 5,622,618
[45] Date of Patent: Apr. 22, 1997

[54] APPARATUS FOR MONITORING CUMULATIVE FLOW OF FLUID THROUGH A FILTER MEDIUM

[76] Inventors: Earl P. Brane, 28200 Thorpe Mtn Dr., Steamboat Springs, Colo. 80477; Douglas K. Brane, 521 D St., Clearwater, Fla. 34616

[21] Appl. No.: 454,852

[22] Filed: May 31, 1995

[51] Int. Cl.$^6$ .............. B01D 35/143; B67D 5/30
[52] U.S. Cl. .............. 210/88; 73/861.79; 210/87; 210/100; 222/20
[58] Field of Search .............. 73/861.79; 210/87, 210/88, 89, 100, 234, 235, 435, 440, 443; 222/20, 14, 16; 251/230, 248; 74/412 R

[56] References Cited

U.S. PATENT DOCUMENTS

| | | | |
|---|---|---|---|
| 3,853,761 | 12/1974 | McClory | 210/100 |
| 4,359,384 | 11/1982 | Brane et al. | 210/100 |
| 4,681,677 | 7/1987 | Kuh et al. | 210/100 |
| 4,698,164 | 10/1987 | Ellis | 210/100 |
| 4,769,135 | 9/1988 | Norton | 210/100 |
| 4,814,078 | 3/1989 | Stern et al. | 210/440 |
| 4,903,731 | 2/1990 | Pappy | 222/20 |
| 5,050,772 | 9/1991 | Brane et al. | 210/100 |
| 5,065,901 | 11/1991 | Brane et al. | 210/100 |
| 5,525,214 | 6/1996 | Hembree | 210/100 |
| 5,527,451 | 6/1996 | Hembree et al. | 210/100 |

*Primary Examiner*—Joseph W. Drodge
*Attorney, Agent, or Firm*—Mueller and Smith, LPA

[57] ABSTRACT

Apparatus is provided for use as an in-line fluid flow monitor through filter media of a variety typically employed in domestic applications upstream of a kitchen faucet as well as unusually low pressure water supplies. Apparatus includes an outer housing with an input port leading to a rotatable turbine within the housing. The turbine, rotatable about a longitudinal axis, is coupled to an offset gear which, in turn, is coupled to a reduction gear train which includes first and second gear arrays mounted for rotation about a first and second axis located parallel with and spaced from the longitudinal axis. Fluid communication is provided from the turbine chamber through the gear train to an output port. The gear train ends in an output which is engaged in driving relationship with an oppositely disposed rotatable valve member having resilient pawl legs extending therefrom. The pawls are configured to engage the output to provide rotatable ratcheting movement. Fluid flow through the output port is inhibited when a camming stem affixed to the valve member encounters a slot component. Valve closure provides a cue to the user that a predetermined quantity fluid flow occurred. Resetting the apparatus to selected metering quantities occurs by hand manipulating the camming stem from the slot. Apparatus is additionally adaptable to be used with a fluid treatment system including a filter supported from a filter base. Resetting the monitor within the system can occur only when the filter is removed from the base.

17 Claims, 7 Drawing Sheets

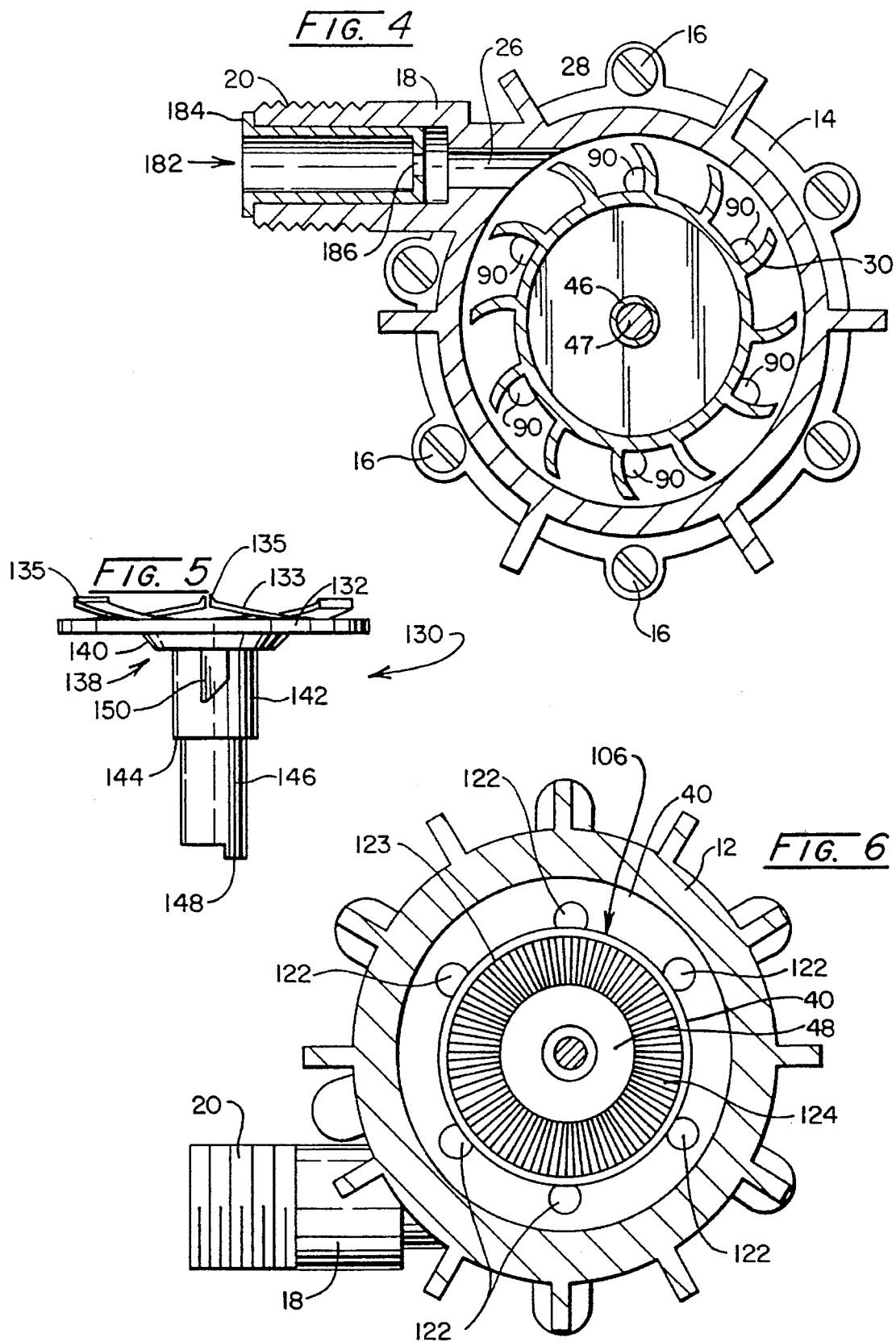

APPARATUS FOR MONITORING CUMULATIVE FLOW OF FLUID THROUGH A FILTER MEDIUM

BACKGROUND OF THE INVENTION

In spite of federal and state water quality regulations, the quality of water provided by municipalities, public wells, and the like to consumers, such as domestic households, ranges widely. Households in fact are still susceptible to contaminants in drinking water. Lead, for example, from municipal distribution water lines or household piping can occur in water regardless of whether the water was first purified at a water treatment plant or otherwise initially at a safe contaminant level. As such, consumer demand for quality potable water has grown in recent years as health awareness concerning contaminants has risen.

In response to these concerns, the water quality enhancement industry has developed a variety of filtration techniques ranging from charcoal filters to reverse osmosis systems. One such common approach to water quality improvement provides for the positioning of a filter at a faucet location where water is drawn for drinking and cooking purposes. The filters used for this application are generally of an in-line variety tapped into the water line upstream from the faucet at the sink. Such filters are quite simple, typically being provided as a retainer holding a filtration medium such as charcoal or the like used to remove contaminants, such as lead, mercury, or carcinogenic compounds from agriculture and industry. These filtration media have a limited capacity to purify generally based on the number of gallons of water passing through them. Following a predetermined flow quantity, the filtration medium must be changed whereupon a next filtering period ensues.

In most instances, a time estimate alone of useful filter medium life is not a dependable method for determining when the filter has reached saturation. The number of gallons used in a household typically varies daily, as well does the quality of water encountered and the type filter used. Consumer attempts at estimating and tracking water consumption in order to determine the filter replacement date are inherently inaccurate. Additionally, filter replacement methods based on a householder's memory of the amount of water used and the projected replacement date are generally not effective.

U.S. Pat. No. 5,050,772 by Brane et al, issued Sep. 24, 1991, entitled "Apparatus for Monitoring a Flow of Fluid Through a Filter Medium" addresses the above consumption tracking problem with the introduction of a monitoring device which is effective for water use monitoring while remaining inexpensive enough for the application at hand. A flow monitoring device is described which may be employed as an in-line fluid flow monitor through filter media of the type typically employed in households upstream of kitchen faucets. In general, the device is structured to include a housing with an input port leading to a rotatable turbine. This turbine is coupled to a reduction gear train positioned within a gear housing. The gear train has a reduction ratio, for example, greater than 1,000,000:1 and provides an eccentric form of output which, in turn, drives a rotatably actuable valve. This valve rotates in increments from a selected starting position and allows the user to hand set the device to monitor a predetermined amount of fluid. As water is passed to a downstream faucet, fluid communication is provided from the turbine chamber through the gear housing and ultimately to and through the valve. Upon monitoring the selected quantity of water, the device automatically cues the user by shutting off the fluid flow exiting an output port leading to the faucet. Thereafter, the user, now reminded to change the filter, may reopen the output port to again allow fluid flow by simply resetting the valve to a selected metering quantity.

The monitor described in U.S. Pat. No. 5,050,772 met with market acceptance for application with filter media requiring replacement after purification from 500 to 1500 gallons of water. Demand developed, however, for a flow monitoring device which could accommodate a much larger flow quantity, for example 2000 gallons. To accommodate this need for enhanced performance, an improved fluid monitor was developed which is described in U.S. Pat. No. 5,065,901 by Brane et al issued on Nov. 19, 1991. This enhanced fluid monitoring device incorporates a gear reduction train with a reduction scheme of greater than 3,900,000:1. As such, fluid monitoring capacity is increased to provide monitoring from 500 to 2400 gallons of water. With the advent of the enhanced monitoring device, filters with larger purifying capacities are usable with a flow monitor which still enjoyed a robust design yet was cost effective and capable of being used under relatively high pressures, as at 400 psi.

In addition to measuring flow, both of these devices are easily adjustable for accommodating various filter capacities and served to cue the user when time for replenishment is at hand. Installation of the monitors remains simple. A common installation is to mount the monitor adjacent to a filtration system on a wall in the sink cabinet. In this regard, the utilization of electronic circuitry, power supplies, or batteries is not needed. As an additional aspect, the devices remain compact in spite of their mechanical monitoring structures which utilize gear reduction ratios exceeding three million to one.

As the popularity of the fluid monitors increases, wider applications for their use is contemplated. For example, small water filtration systems are called for in primitive areas of the world. Often, the water supplies at such locations which are available for filtration will be at unusually low pressures and flow rates. Such local water supplies in third world countries may, for example, be available at 10 psi and at a flow rate of 0.2 gallons per minute. Generally, these pressures and flow rates are insufficient to drive a simple turbine, an aspect that may preclude the use of earlier, inexpensive monitors for that application.

Market demands have further prompted the water quality enhancement industry to supply filter media of increased filtration capabilities. Introduction of these filter media, in turn, have further called for flow monitors with enhanced performance characteristics. Although the above described prior devices have performed admirably, they have not been concerned with safeguarding against over use of the filtration system. Once the predetermined amount of water is consumed, the accompanying saturated filter should be replaced. It has been observed that if the filter is not changed upon reaching its saturation limit, contaminants may loosen and release into the drinking or cooking water supply. In this regard, saturated filters may release more contaminants into the water than would otherwise exist without a filtering device.

Users, unfortunately, have, from time to time, simply reset the monitor instead of changing the filter. In doing so, users may be unexpectedly exposed to potentially higher levels of contamination as particles and bacteria loosen and break free from the filter to the drinking or cooking water. At present, industry and consumers alike would welcome a fluid monitoring system which not only has the advantages of the prior devices but also has a larger capability with an improved safeguard against filter over-use.

SUMMARY

The present invention is addressed to an apparatus for monitoring the flow of fluid through a conduit. Suited to higher line pressure in-line household applications as well as unusually encountered low pressure water supplies, the monitoring apparatus is fabricable at practical cost. While exhibiting an advantageous monitoring capability essentially doubling that of former devices, the improved fluid monitor is fabricable to provide a range of capacities. This flow capacity range aspect is achieved without altering the housing envelope of the device.

Utilizing a turbine to impart a flow-to-mechanical monitoring output, the monitor may incorporate a rotational reduction scheme of greater than 8,000,000:1. While achieving this doubling of capacity, the monitor remains housed within a highly compact structure. Necessary cuing to the user that a filter medium is expended is by the simple procedure of turning off the fluid or water flow to an associated downstream faucet. The resetting procedure for the monitor remains advantageously simple, requiring an elementary hand motion on the part of the user. Further, the device may be readily adjusted by the user to accommodate various flow capacities as required by different filter media.

To achieve a simplicity of assembly, the monitoring apparatus is configured such that a sub-assembly is formed including a gear housing generally cylindrically configured with a top and bottom portion forming two ends. Mounted from the top about a centrally disposed longitudinal axis is a turbine. The turbine is positioned for rotation using a pin mounting assembly which is notably advantageous in that tolerance and friction inherent with turbine rotation are reduced. Depending from the turbine is a turbine gear portion coupled to an offset gear which, in turn, imparts drive to a reduction gear train. This reduction gear train includes two spaced apart gear arrays, each array being mounted for rotation about an axis located parallel with and spaced from the longitudinal axis. The offset gear, while contributing to reduction requirements, permits an off-axis spacing of the gear arrays while, additionally allowing the implementation of a highly friction free turbine mounting. As a result of the improved gear array positioning, larger gear reduction ratios within the compact gear housing are realizable.

Fluid communication is provided from the turbine chamber through and about the gear housing to an output port. The reduction gear train at the bottom portion of the housing is offset with respect to the longitudinal turbine axis. This output rotates a drive gear having a valve drive portion at its lower surface with an annular array of canted teeth. These teeth are contacted in driving relationship with upwardly extending pawl legs of an oppositely disposed rotatable valve member. The pawls are configured to engage the teeth of the valve drive portion to provide rotatable ratcheting movement necessary for resetting the valve. Spring biasing of the valve member vertically along the longitudinal axis also may be achieved by employing such pawl assembly.

The rotatable valve member rotates to effect a closed valve orientation, providing for blockage of fluid flow through the output port, and an open valve orientation, providing for flow therethrough of a predetermined quantity of fluid. As rotation occurs, a camming stem affixed to the valve member moves along a camming surface until encountering a slot component. When the slot component is encountered, the camming stem falls into it under spring bias. Thereafter, the output port is blocked and fluid is inhibited from flowing therethrough. Valve closure provides a cue to the user that a predetermined quantity of fluid flow has occurred. The device then is simply reset by hand by manipulating the camming stem back upon the camming surface.

The fluid monitoring device is additionally adaptable to be used with a fluid treatment system to monitor the flow of fluid therethrough. These treatment systems typically have a filter cover and filter medium supported from and removably attached to a filter base assembly. Located within the base assembly is a service region into which a monitor is mounted. The monitor valve member is configured to include a reset component which is engageable by the user to position the valve member to the open orientation. User access for resetting the reset component is provided through an access channel extending through the base into the service region. This access channel additionally permits fluid communication between the monitor and filter. After a predetermined amount of fluid is monitored., valve closure cues the user that the filter needs to be changed. Thereafter, resetting the monitor can occur only when the filter cover is removed from the base assembly. This necessary filter cover removal further reminds the user to replace the filter in addition to resetting the monitor.

Other objects of the invention will, in pan, be obvious and will, in pan, appear hereinafter. The invention, accordingly, comprises the apparatus and system possessing the construction, combination of elements, and arrangements of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 4 is a sectional view of the apparatus of FIG. 3 taken through the plane 4—4 thereof;

FIG. 5 is a side view of a rotatable valve employed with the apparatus of FIG. 1;

FIG. 6 is a sectional view of the apparatus of FIG. 3 taken through the plane 6—6 thereof;

DETAILED DESCRIPTION OF THE INVENTION

Water flow monitors structured in accordance with the invention are relatively small and capable of carrying out a gear reduction of the output of a small turbine at a reduction ratio greater than 8,000,000:1. This reduction is achieved within an inexpensive structure which still remains of such robust design that it is capable of being used in line under relatively high fluid pressures, such as those encountered with household water lines as well as with low fluid pressures that may be encountered in more primitive regions. Further, when used in households, the monitors provide the householder with a cuing as to the point in time when the capacity of an associated filter medium has been reached. Cuing is achieved by closing off the fluid flow, or at least substantially closing it off, such that the user is aware that filter replacement is needed and the flow monitoring device is to be reset. The monitor is additionally adaptable to be used as an integral component of fluid treatment systems generally including a replaceable filter assembly supported upon a filter base. Of importance, the monitor is positioned within the system such that removal of the filter is required before resetting can occur, thus assuring that the filter medium will be changed. The resetting components are designed to allow the user to set the monitor to a variety of filter capacities as expressed in volumetric values to accommodate different filter media.

Figure 1:
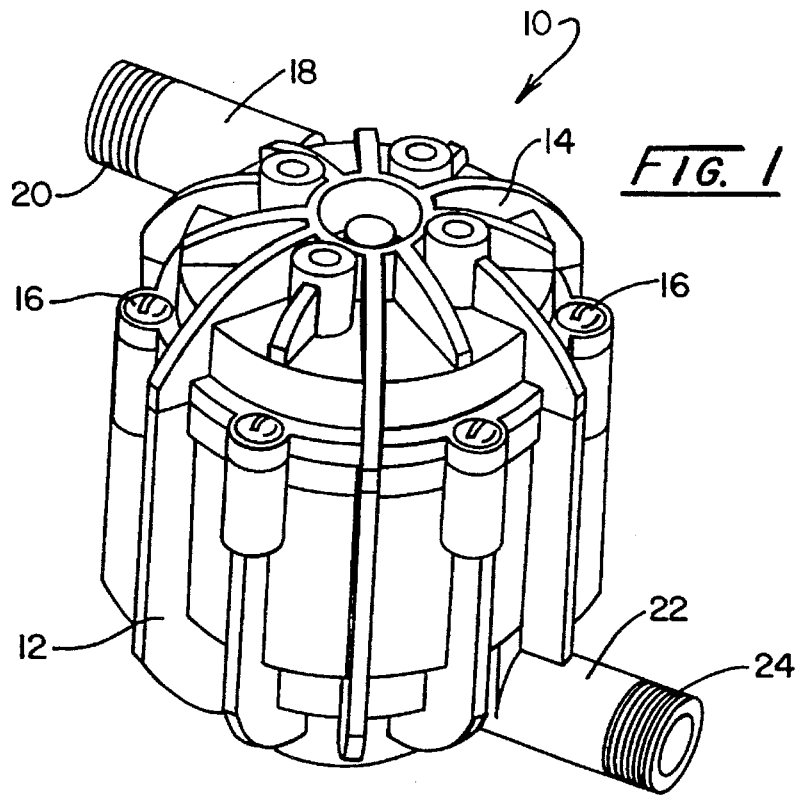
FIG. 1 is a perspective view of a fluid flow monitor according to the invention.

Looking to FIG. 1, a monitor according to the invention is represented generally at 10 as including an outer housing 12 with a body portion of strong ribbed construction and having a cap portion 14 which is attached thereto by an array of screws, certain of which are represented at 16. Note that the cap 14 also is configured having reinforcing ribs thereon. Leading to the cap 14 is an input conduit 18 having a threaded end portion 20 suited for coupling with a domestic water line. In similar fashion, the lower region of outer housing 12 has integrally formed therein an output conduit 22 having a threaded end portion thereon 24 for supplying to a fluid service line or to a water line-filter assembly, i.e., the monitor may perform essentially anywhere within a fluid path. To remain within necessary cost constraints, housing 12 and cap 14 are formed of plastic. The selection of this plastic material preferably is such as to provide a very strong polymer, for example a glass filled "Nylon" material identified as number 7033 marketed by E. I. DuPont De Nemours and Company.

Between the input conduit 18 and the output conduit 22, fluid is caused to flow through the device 10 in somewhat of an axial manner coursing across the components which carry out the monitoring function. Looking additionally to FIG. 2 in conjunction with the figures to follow and, for the instant description to FIGS. 3 and 4, fluid enters the device 10 from input conduit 18 at an input port 26 extending, in turn, to a turbine chamber 28 formed within cap 14. A turbine 30 is rotatably mounted within the chamber 28 and is driven from fluid entering the input port 26. Note that the turbine is configured for unidirectional rotation.

Figure 2:
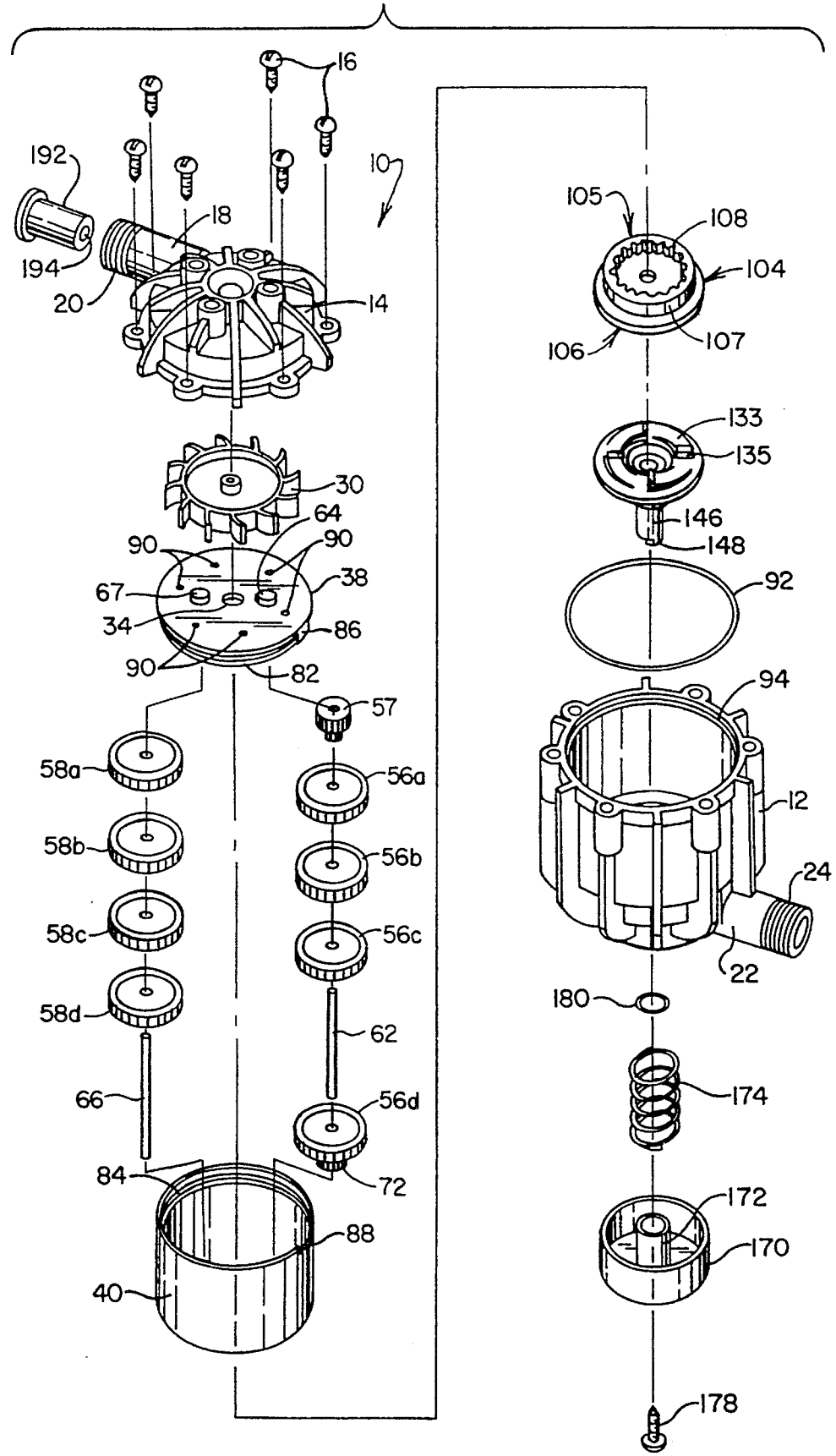
FIG. 2 is an exploded perspective diagram of the apparatus of FIG. 1.
Figures 3, 8:
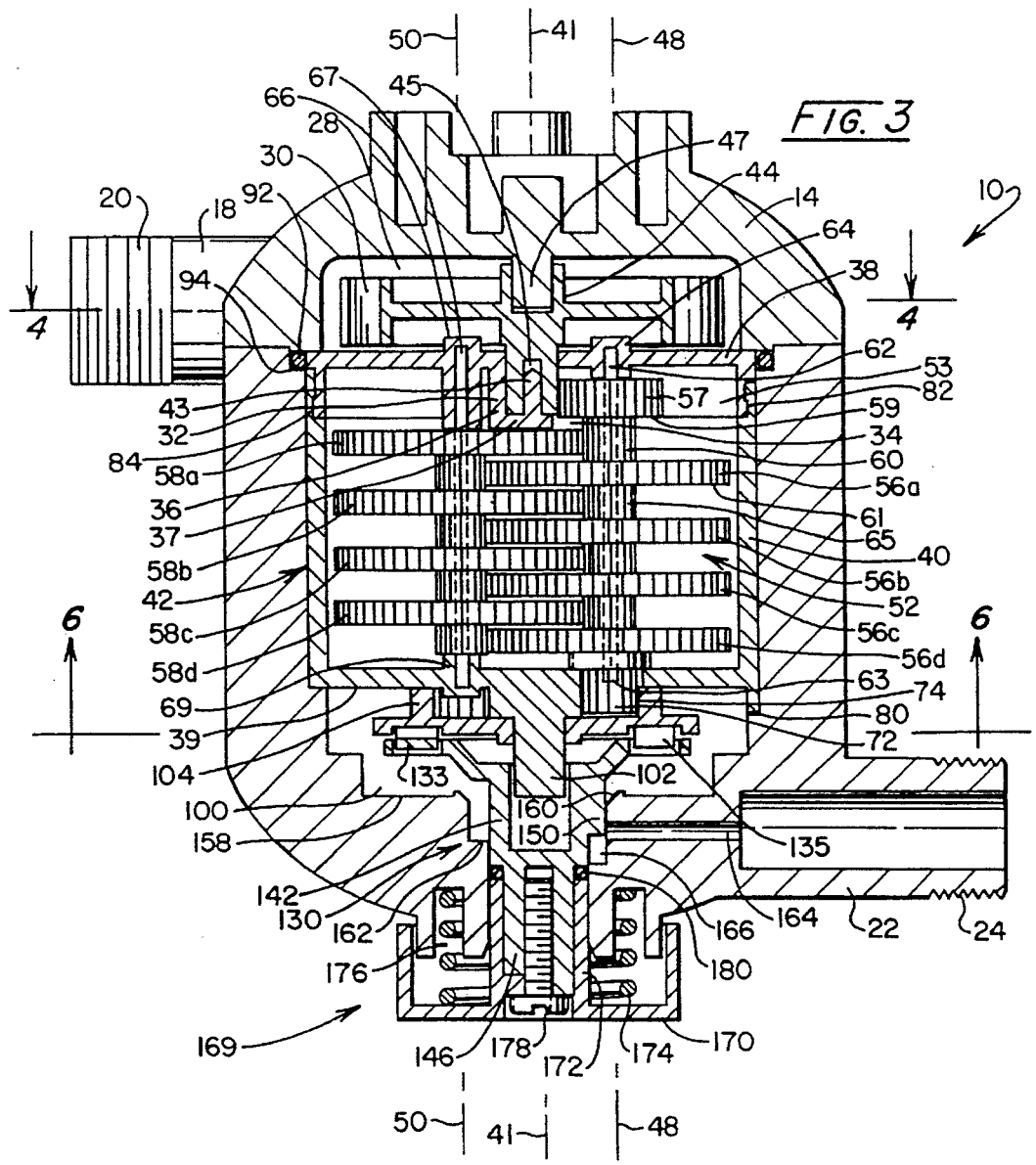
FIG. 3 is a partial sectional view of the apparatus of FIG. 1.
FIG. 8 is a partial sectional view similar to that shown in FIG. 3 but representing the valve components thereof in a closed orientation.

FIG. 3 reveals a gear housing assembly represented generally at 42. Housing assembly 42 includes a top portion 38 and a bottom portion 39 formed as pan of a gear housing component 40 which is cylindrically configured with a centrally disposed longitudinal axis 41 extending vertically therethrough. A downwardly depending turbine gear portion 32 of turbine 30 extends through a housing aperture 34 (FIG. 2) within top portion 38. From aperture 34, there extends a downwardly depending semi-cylindrical turbine support component 36 which is configured to receive turbine gear portion 32. Turbine support component 36 is seen to be structured having a longitudinal opening for receiving the tooth containing periphery of an offset gear 57. Component 36 terminates in a bottom portion 37 having a lower turbine shaft pivot 43 extending upwardly therefrom formed as an upstanding, generally cylindrically shaped pin. The turbine gear component 32 terminates in an inwardly depending channel bearing cavity 45 which is configured to receive pin 43 to provide lower rotational bearing support of turbine 30. Oppositely disposed from turbine gear 32 is a bearing component 46. Component 46 is formed as an upwardly extending open bearing component cylinder having an internal bearing cavity therein and is dimensioned to receive a cylindrical upper turbine shaft pivot 47 extending from the interior of cap 14. Together, lower shaft pivot 43 and upper shaft pivot 47 function to receive and provide readily aligned bearing support for turbine 30. Thus mounted, turbine 30 is concentrically aligned with the gear housing longitudinal axis 41 and is easily assembled into position for driving association with a reduction gear train represented generally at 52. The above described mounting for turbine 30 is advantageous over other forms of turbine attachment, in that bearing friction has been substantially reduced. As a consequence, lower flow rates and water pressures will be found sufficient to drive turbine 30 and gear train 52. As is also apparent, the improved mounting technique allows for quick and accurate alignment of turbine 30 in chamber 28 during assembly stages.

Reduction gear train 52 is positioned within a gear chamber 53 and is seen to include first and second gear arrays of rotatable gears 56a–56d and 58a–58d, respectively, and the above noted offset gear 57. Turbine gear 32 is meshed in driving relationship with offset gear 57 which, in turn, is meshed in driving relationship with gear 58a. As FIG. 3 reveals, offset gear 57 has an upper gear component 59 and an integrally formed lower gear component 60 depending outwardly. Likewise, each gear 56a–56d and 58a–58d 58d is seen to have a cylindrical upper component, as represented at 61 in connection with gear 56a, and a lower gear component 65 extending downwardly therefrom and formed integrally therewith. For the instant embodiment, gears 56a–56d and 58a–58d are identically structured. Coupling between adjacent gears within the gear train begins with lower gear component 60 and upper component 61 of gear 58a and then continues in reduction ratio defining fashion downwardly through the gear train. The upper component of offset gear 59 is dimensioned to establish the important spacing of the axes of each of the gear arrays. For example, gears 56a–56d extend along a first drive axis, shown at 48, and gears 58a–58d extend along a second drive axis, shown at 50. The first and second axes 48 and 50 are parallel with and spaced from the central longitudinal axis 41. As such, gear chamber 53 can accommodate upper gear components as at 61 which have a maximized diameter larger than the radius of the gear housing 40, and in particular top portion 38. These larger gear diameters permit a more efficiently utilized available space within gear housing 40, in turn, permitting development of a greater reduction ratio. As configured, the gears are able to provide a gear reduction ratio of greater than 8,000,000:1. As such, users have available metering capabilities which range up to 4000 gallons of water.

As revealed by FIGS. 2 and 3, gears 56a–56d are supported in their vertical orientation by a steel shaft 62. A cylindrical receiving cavity 64 formed within top portion 38 supports shaft 62 at one end. The other end of shaft 62 extends into a centrally disposed cavity 63 within gear 56d. Gears 58a–58d are maintained in their vertical orientation through a similar attachment along the second drive axis 50. In this regard, the gears are supported by a steel shaft 66 which extends into an upper receiving cavity 67. The other end of shaft 66 extends into an oppositely disposed cavity 69 formed within bottom portion 39 of gear housing 40.

As turbine 30 is rotated by fluid flow, the gear train 50, in turn, is driven to derive the noted gear reduction, ultimately resulting in a drive output present at an output gear component 72 integrally formed with gear 56d. Output gear 72 extends through an aperture or opening 74 within the bottom portion 39 of gear housing 40.

The gear housing 40 is seen to be positioned within a corresponding gear chamber 53 of outer housing 12 and is insertable within that chamber. Proper alignment of housing 40 within chamber 53 occurs by virtue of an integrally formed aligning tab 80 extending vertically along the exterior of housing 40. Tab 80 fits within a corresponding vertical receiving slot 168 extending vertically along the interior wall of outer housing 12, shown in FIGS. 7 and 8. As such, the correct positioning of housing 40 within chamber 53 is assured. The housing component 40 forms one aspect of the device 10 which facilitates its manufacture. Cover or top portion 38 is snapped readily into its cover position by virtue of a ridge 82 formed therein which engages a corresponding groove 84 within the housing component 40. To assure the proper alignment of the cover 38, a tab 86, as seen in FIG. 2 formed therein, engages a slot 88 within housing component 40.

The components of gear housing assembly 40 thus far described are readily manufacturable with the holding of tolerances for the reduction gear train 52 and the turbine 30. This is achieved, inter alia, by virtue of the rigid retention of drive shafts 62 and 66 in isolation from the rotational mounting of turbine 30. Tolerances are achieved, therefore, with a readily assembled sub-assembly which will be seen to include certain additional components in keeping with this improved assembly approach.

With the arrangement described, the initial drive to reduction gear train 52 is from the turbine gear portion 32 of turbine 30. During the course of this reduction, fluid flows from the input conduit 18 and input port 26 into the turbine chamber 28. Thereafter, it is caused to flow through a plurality of fluid communication ports 90 formed within the gear housing top component 38, as seen in FIG. 2. Once the fluid passes through ports 90, it enters the interior of housing 40. As FIG. 6 illustrates, a plurality of fluid communication ports at 122 are formed within the gear housing bottom portion 39 for purposes of permitting fluid flow from gear housing 40. Looking to FIGS. 2 and 3, fluid tight integrity for the cap 14 and outer housing 12 combination, as well as the gear housing 40, is provided by an O-ring 92 mounted on a shoulder 94 formed within housing 12. Positioned immediately beneath gear housing 40 is a valve chamber 100, as seen in FIGS. 3 and 8. A portion of the gear housing assembly 42 will be seen to extend into this chamber 100. In this regard, looking to FIGS. 2, 3, and 6 it may be seen that the bottom portion 39 is configured to form a hub or axle 102 which serves as the central hub for the rotational support of a drive gear 104. As best seen in FIG. 2, drive gear 104 is generally formed having an engaging portion 105 and a valve drive portion 106. Engaging portion 105 is configured as a ring 107 which is formed having a plurality of internally disposed teeth 108. Teeth 108 are meshed in driven relationship with the teeth of output gear 72. The valve drive portion 106 of drive gear 104 is revealed in FIG. 6 to be formed of a flat disk upon which is formed a radial array of canted ratchet teeth 124. These teeth 124 form one component of a ratchet drive arrangement wherein a rotating valve may be driven by an engagement with teeth 124 while being resettable by applying a resetting force in the opposite rotational direction.

Looking to FIGS. 2 and 5, a valve member 130 performing in conjunction with ratchet teeth 124 is revealed and includes an upwardly disposed engaging component or disk 132 which is seen having two pairs of oppositely disposed resilient pawls 133 extending outwardly. Each pawl 133 is integrally formed with disk 132 and is canted at an outwardly disposed end to form a capture portion 135 which is configured to be engageable with ratchet teeth 124. Pawls 133 additionally function as resilient legs or springs to contribute to the spring biasing of valve member 130 along longitudinal axis 41. In this regard, it should be observed that the valve member 130 is vertically moveable under the spring force to a closed or open orientation while teeth 124 remain engaged within capture recesses 126. The pawls 133 are depicted in FIG. 3 to be compressed in an open valve orientation and are depicted in FIG. 8 in a closed valve orientation.

Returning to FIG. 5, the valve member 130 also is seen to include a valve actuating portion shown generally at 138 having a beveled component 140 extending from upwardly disposed disk 132. From beveled component 140, a cylindrical valve shaft 142 extends to a valve shoulder 144 from which there extends a valve support stem 146. Stem 146 also is halved at its bottom portion to form a half cylindrical extension 148 which is utilized as a coupling structure for the manual rotation of the valve member 130. Of particular note, however, is a camming stem 150 formed integrally with the valve shaft 142. The camming stem 150 functions to retain the rotatable valve member 130 in an open orientation during its slow rotation carded out under the drive of drive gear 104 performing in response to the output of the reduction gear train 52.

Figure 7:
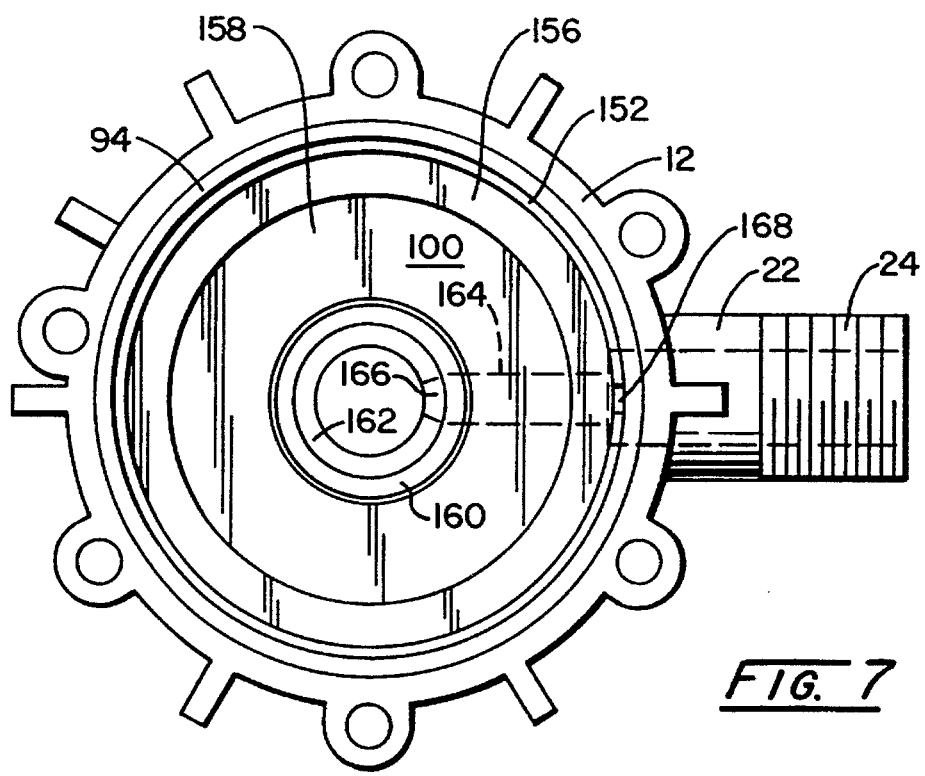
FIG. 7 is a partial top view of the apparatus of FIG. 1 with portions removed to reveal internal structure.

Referring additionally to FIG. 7, a view looking into housing 12 without the presence of other components, including the rotatable valve member 130, is presented. In the figure, a shoulder 152 upon which the gear housing component 40 bottom surface 39 rests is revealed, and adjacent to that shoulder is the valve chamber 100. The chamber 100 is stepped initially at a ridge 156 and then descends to a lower surface thereof at 158. The lower surface 158 of the valve chamber 100 leads to a beveled valve seat represented at 160. Below the beveled valve seat 160 there is formed a circular valve cam surface 162. It is upon this surface 162 that the camming stem 150 of valve member 130 slides during that period of performance of the monitoring device 10 when the valve components are in an open orientation. This open valve relationship is revealed in the orientation of components shown in FIG. 3. In this regard, during an open orientation, the rotatable valve member 130 is elevated by virtue of the camming action of the camming stem 150 against the valve cam surface 162 and an output port 164 seen leading to output conduit 22 is open to permit the fluid passage.

Returning to FIG. 7, when the camming stem 150 (FIG. 5) has rotated under the drive of drive gear 104 to the position of a detent or closing slot 166 extending downwardly from the valve cam surface 162, the rotatable valve member 130 will drop under the noted bias as the camming stem 150 inserts within slot 166. As this occurs, pawls 133 on disk 132 (FIG. 5) will further extend from the disk top surface to an extent that capture portions 135 will remain biased in ratcheting engagement with ratchet teeth 124, as revealed in FIG. 8. In FIG. 8, the orientation of the components for this closed valve in condition wherein the camming stem 150 has dropped into slot 166 is revealed. In this closed orientation, output port 164 is substantially blocked by the rotatable valve member 130. As such, the valve member 130 cannot rotate and liquid flow through the output port 164 is essentially blocked, cuing the user to intervene and reset the monitoring device 10.

The resetting components of the monitoring device 10 are located at the bottom of outer housing 12, shown as a reset assembly 169 in FIG. 3. Assembly 169 includes a hand manipulative cylindrically shaped dial 170 having a hollow central stem 172 which extends over the stem portion 146 of rotatable valve member 130. The internal head portion of the stem 172 is configured in semi-cylindrical fashion to abuttably interact with the cylindrical extension 148 (FIG. 5) of the rotatable valve component 130. Thus, rotation of the dial 170 will, in turn, cause rotation of the rotatable valve member 130. A helical spring 174 is shown interposed between the dial 170 and a cylindrically shaped slot 176 formed within the bottom of housing 12. Dial 170 is retained against the stem 146 by a screw 178, and the arrangement additionally functions to position a flexible O-ring 180 to provide a fluid tight seal for the assembly. Spring 174 functions to bias the rotatable valve member 130 downwardly both in the closed position shown in FIG. 8 and to provide a bias of a camming stem 150 against the corresponding valve cam surface 162 of housing 12 when the open orientation represented in FIG. 3 is at hand. This bias also facilitates the valve closing action as camming stem 150 falls into slot 166.

To reset the device 10, the user depresses the dial 170 to compress spring 174. As a consequence, the camming stem 150 is elevated. The user then rotates dial 170, moving the camming stem 150 over camming surface 162 as pawls 133 move out of engagement with ratchet teeth 124. Release of the dial 170 permits re-engagement of pawls 133 with teeth 124 along with an open orientation of the valve member 130 and rotation thereof by rotational drive component 104. As is apparent, the extent of rotation of dial 170, in turn, adjusts the quantity of fluid monitored. Appropriate indicia (not shown) may be provided for this use. The extent of movement of the valve member 130 in the course of either closing or during the resetting and opening thereof is quite small being, for example, about 0.070 inch.

The size of filters with which the instant monitoring device 10 will perform may vary from installation to installation. For example, some filters may call for a flow rate of about 2 gallons per minute, while others are designed for flow rates of one-half to three-fourths gallons per minute. For lower flow rates, however, an orifice may be used. Looking to FIG. 4, an orifice insert, represented generally at 182, is seen to be inserted within the input conduit 18. Insert 182 is provided with an outer flange 184 which engages the outer surface of conduit 18 and which extends to an opening representing an orifice of smaller diameter as shown at 186. With such an arrangement, flow into device 10 may be regulated to a lesser desired rate.

The monitoring device described hereinabove also is adaptable to be used as an integral part of a system for treating fluid. Typically, these treatment systems filter, purify, neutralize, soften, or otherwise condition water and are used at faucet locations where water is drawn for drinking or cooking purposes. Treatment systems of this type commonly require periodic cleaning or changing of a filter medium. Heretofore, one shortcoming with these systems has been inadequate protection against overuse of the filter medium. That is, once a predetermined amount of water has been treated, the filter medium reaches a saturation limit and thereafter should be replaced or otherwise cleaned. It has been observed that if filter replacement is not effected, filtered contaminants may loosen and release into the drinking or cooking supply. Users, unfortunately are known to reset the monitor without changing the filter medium. The water treatment system shown in FIG. 9 is configured to discourage such improper use.

Figure 9:
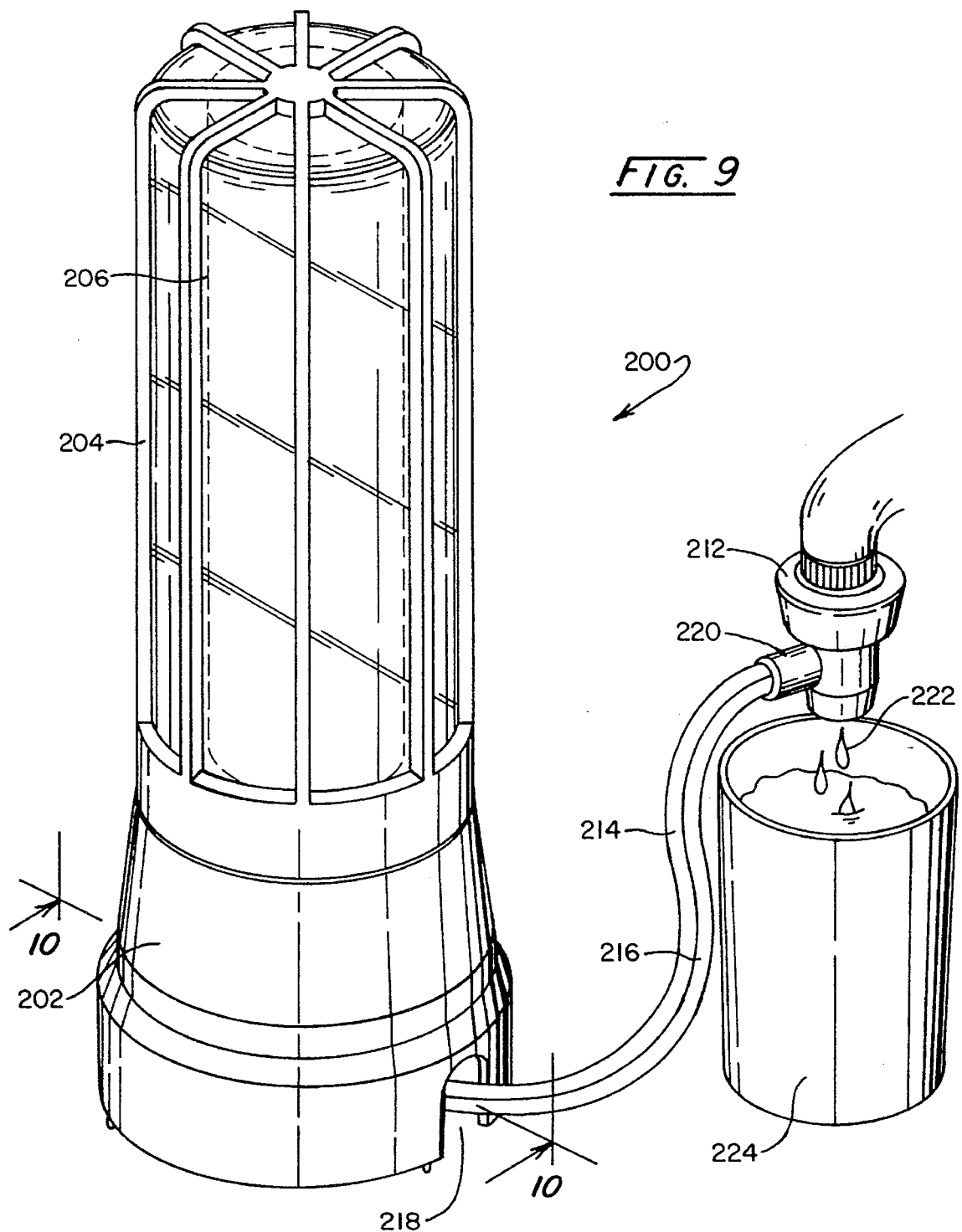
FIG. 9 is a perspective view of a fluid treatment system according to the invention.

FIG. 9 illustrates a system for treating water generally at 200. The system is shown to include a filter base assembly 202 and filter cover 204 having a filter medium housed therein, shown as dashed line 206. Located within base assembly 202 is a filter monitor (not shown). System 200 is particularly suited for use at faucet locations, such as that shown at 212. Fluid communication between faucet 212 and treatment system 200 occurs via a supply line 214 and a service line 216. Lines 214 and 216 are shown to emerge from an opening 218 in base assembly 202 and thereafter connect at 220 to faucet 212. Untreated water initially flows from faucet 212 through supply line 214 to base assembly 202. Thereafter, the water flow is monitored by the monitor (not shown) and treated by filter 206. Treated water then passes (via service line 216) from base assembly 202 to faucet 212, wherefrom it may be dispensed, for example as treated water 222 into a drinking glass or container 224.

Figure 10:
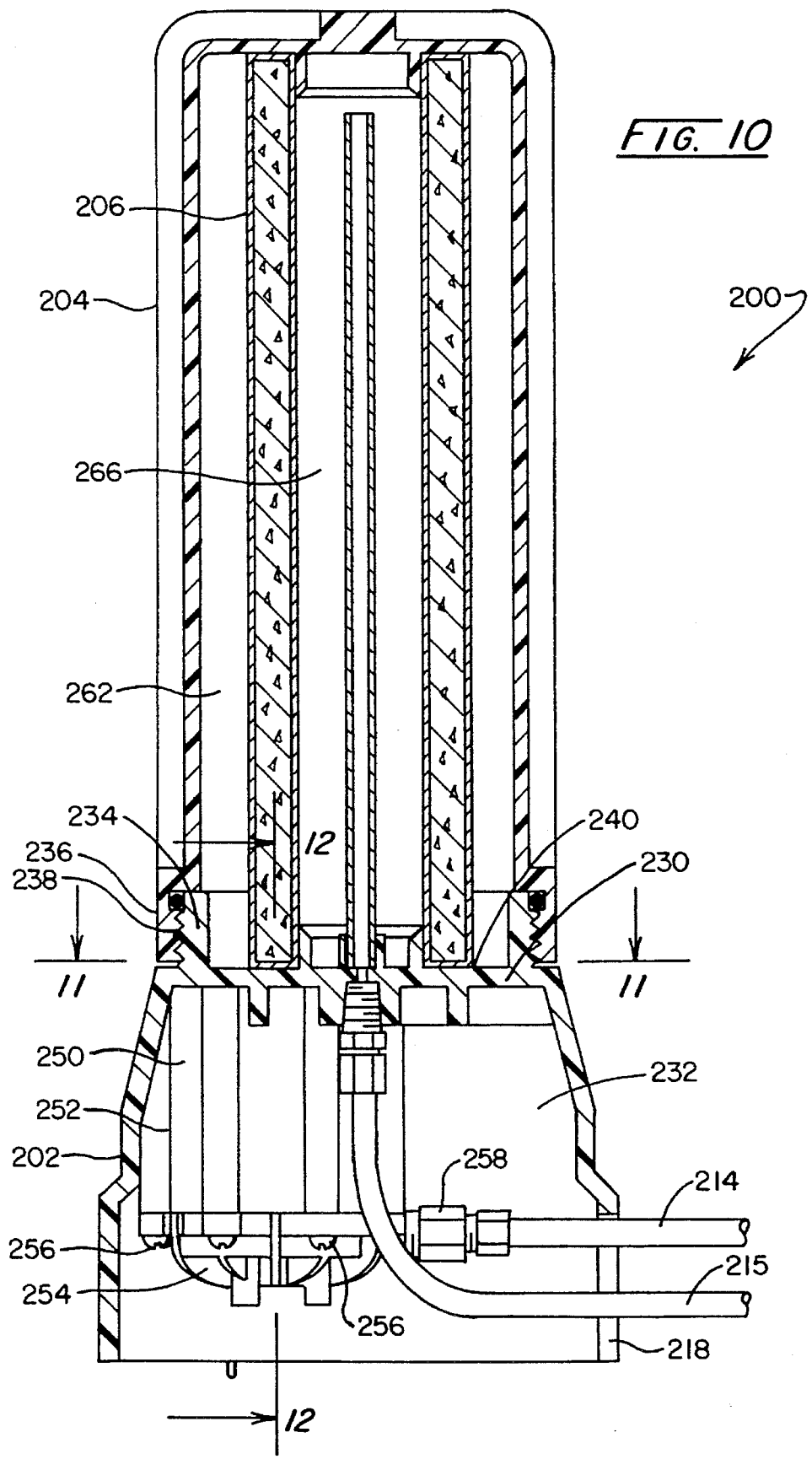
FIG. 10 is a partial sectional view of FIG. 9 taken through the plane 10—10 thereof.
Figure 11:
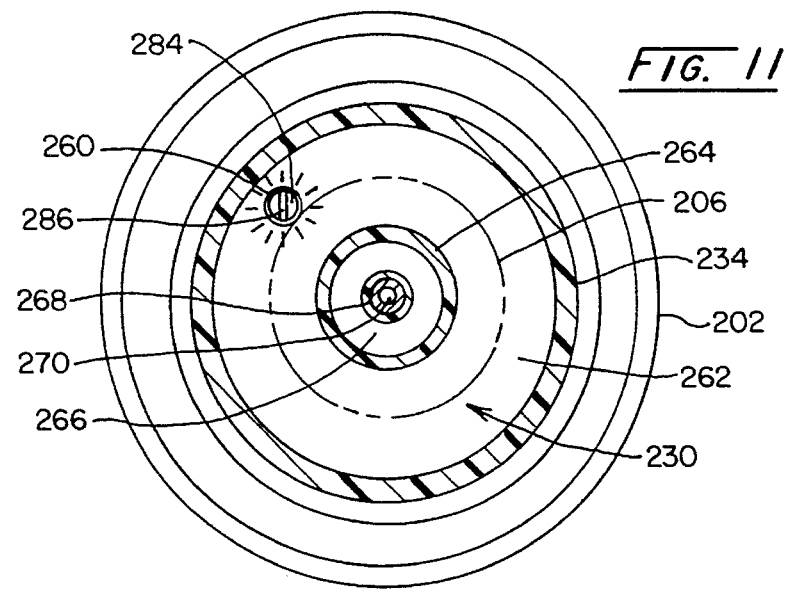
FIG. 11 is a top sectional view of FIG. 10 taken through the plane 11—11 thereof.

Looking to FIGS. 10 and 11, fluid treatment system 200 is depicted in enhanced detail. Base assembly 202 is shown to have a cartridge or filter receiving and supporting region 230, and a service region 232. Removably mounted on receiving and supporting region 230 is filter cover 204 and filter 206 having a support portion 240. Filter cover 204 is shown to be removably connectable to base assembly 202 in order to give the user accessibility to receiving and supporting region 230, and ultimately filter 206 and a filter monitor 250. The mounting of filter cover 204 onto base 202 is accomplished by a threadable engagement. In this regard, a support wall 234 is threaded on its exterior surface and is integrally formed to extend upwardly and generally about the periphery of receiving and supporting region 230. Filter cover 204 has an end portion 236 which is threaded about the interior of its cylindrical base to threadably engage wall 234, as shown at 238.

As FIG. 10 illustrates, a flow monitor 250 is positioned within base assembly 202. In this regard, monitor 250 is secured within service region 232, which region is formed as a cavity within base assembly 202 oppositely disposed from receiving and supporting region 230. Attachment of monitor 250 within this region may be accomplished, for example, by a screw mounting. Preferably, monitor outer housing 252 is integrally formed with base assembly 202 during the molding or manufacturing thereof. A detachable cap 254 is shown connected to outer housing 252 by an array of screws 256.

Any of several known techniques may be used to treat untreated water. A common method is to pass the water through a filter media, such as a charcoal filter, wherein impurities or minerals are extracted. Such mediums require periodic replacement after a predetermined volume of water has been treated. FIGS. 10 and 11 show a typical filtration technique employed within treatment system 200.

During treatment, untreated water enters base assembly 202 through supply line 214 which is coupled to an input port connection 258 of monitor 250. Water flow is monitored within monitor 250 and then is directed to flow through an access channel 260 (FIG. 11) which leads to a receiving cavity 262 within filter cover 204. Access channel 260 is located within receiving and supporting region 230 adjacent the output port (not shown) of monitor 250. Preferably, this channel is configured as a bore extending into service region 232 through receiving and supporting region 230. After entering cavity 262, water, under pressure, is treated as it passes through filter medium 206 and enters an adjacent fluid retainer cavity 266. Extending vertically inside cavity 266 is an elongate fluid transfer line 268. Treated water accumulates and rises within cavity 266 until it reaches an upwardly disposed opening 270 of line 268. At this level, water passes down through line 268 to service line 216. Thereafter, the service line may be directed to a user accessible location, such as the faucet 212 of FIG. 9.

Once a predetermined amount of water is monitored by monitor 250, fluid communication between faucet 212 (FIG. 9) and fluid treatment system 200 is essentially impeded, thereby cuing the user that the time for replacing or otherwise servicing filter 206 is at hand. In order to re-establish water flow through system 200 to faucet 212, monitor 250 must be reset. Access for resetting monitor 250, however, can only occur when filter cover 204 is removed from base assembly 202. Once filter cover 204 is removed, the user may reset monitor 250 through the use of a common screwdriver extending into access channel 260. Requiring the removal of filter cover 204 prompts the user to change filter 206 in addition to resetting monitor 250.

As illustrated in FIG. 10, untreated water is first monitored and then treated. It will be appreciated, however, that monitor 250 can be connected to monitor treated water. Additionally, the position of monitor 250 is not restricted to that described in FIG. 10. The significance of the placement is that the monitor 250 may be set or reset only when the filter cover 204 is removed from base assembly 202.

Figure 12:
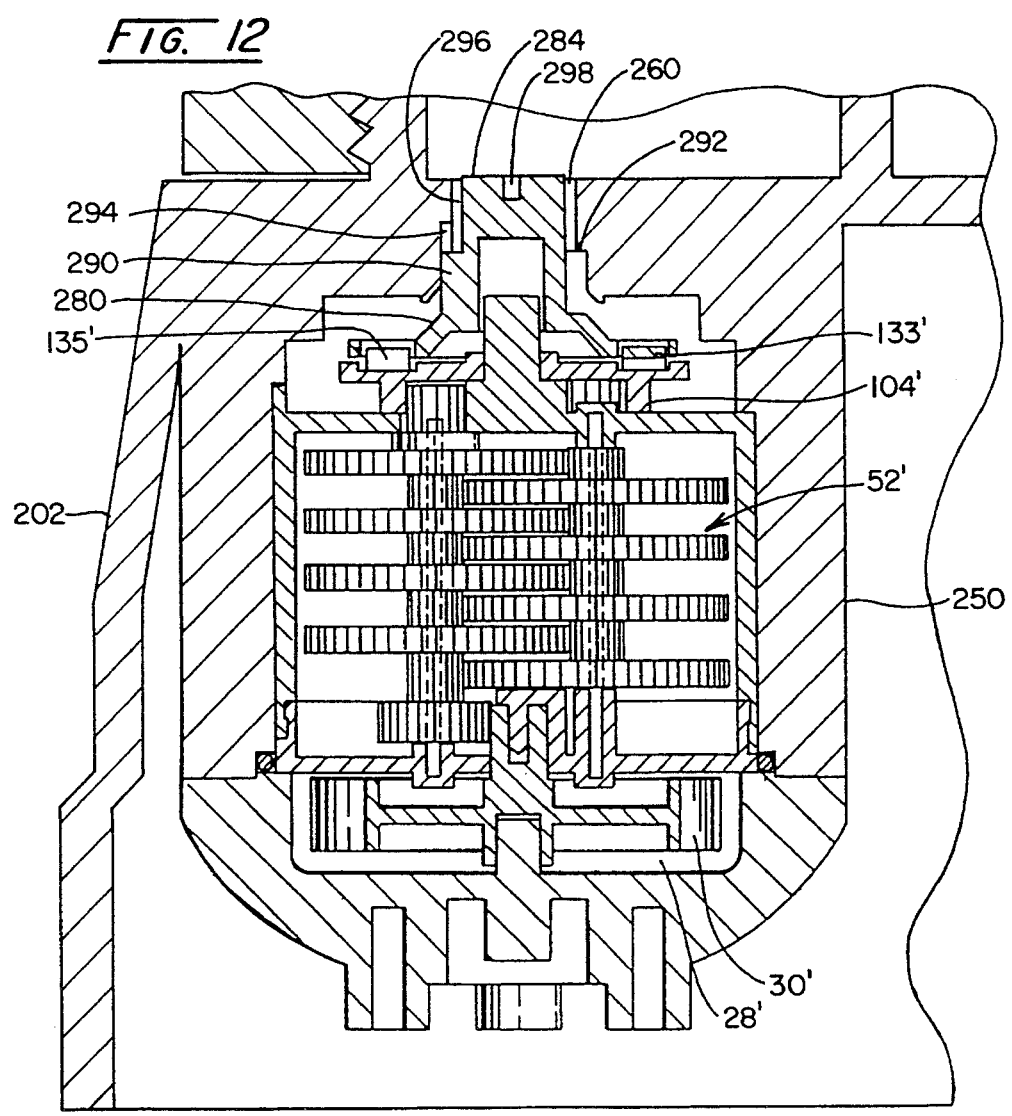
FIG. 12 is a partial sectional view of FIG. 10 taken through the plane 12—12 thereof.

FIG. 12 shows monitor 250 within base assembly 202 to be configured similarly to monitor 10. Accordingly, those components of monitor 250 which remain identical with respect to monitor 10 retain the earlier numerical identification, but in a primed fashion. As in monitor 10, water under pressure enters turbine chamber 28' of monitor 250 and rotatably drives turbine 30' which is, in turn, engaged in a driving relationship with reduction gear train 52'. Thereafter, reduction gear train 52' drives drive gear 104' which, in turn, is engageable in driving relationship with a valve member 280. One difference with monitor 250, however, is that the reset assembly 169 of monitor 10 (FIG. 3) is not present. In particular, dial 170, spring 174, and screw 178 are not present. Discussed in conjunction with FIG. 3, spring 174 functions to bias camming stem 150 against valve cam surface 162 and facilitates the valve closing action when camming stem 150 falls into slot 166. FIG. 12 reveals that valve member 280 functions as both the previously described reset assembly 169 and valve member 130 of monitor 10. The particulars of this feature are best shown by referring also to FIG. 5. The resilient pawls 133' provide all required biasing and serve to eliminate the separate spring of monitor 10. In this regard, while in the open orientation, pawls 133', without the aid of a spring, bias valve member 280 away from gear train 52'. Thus, as shown in FIG. 12, pawls 133' function to bias a camming stem 290 against a valve cam surface 292. It is upon this surface 292 that camming stem 290 slides during that period of performance of monitor 250 when water flow is being monitored. When camming stem 290 rotates under the drive of drive gear 104' to a position of a detent or closing slot 294, extending upwardly from valve cam surface 292, camming stem 290 is urged under the bias of pawls 133' into detent 294. As this occurs, rotatable valve member 280 moves from the open orientation to a closed orientation. In the closed orientation, a cylindrical reset extension 296 of valve member 280 moves into access channel 260. Valve member 280 cannot rotate and water flow through access channel 260 is substantially blocked, cuing the user to intervene. Filter cover 204 (FIG. 10) then may be removed from base 202, giving the user access to receiving and supporting region 230, and in particular access channel 260 to re-position valve member 280 into the reset or open orientation.

In order to reset monitor 250, the user engages reset component 284 and depresses valve member 280. Looking also to FIG. 11, it is revealed that reset component 284 is provided with a slot 286. Preferably, slot 286 is dimensioned to receive a common screwdriver to effect depression and subsequent rotation of valve member 280 to the open or reset orientation. As reset component 284 is depressed toward drive gear 104', resilient pawl legs 133' are compressed and canning stem 290 is moved from detent 294. The user then rotates reset component 284 in a ratcheting action over camming surface 292. Thereafter, a desired flow quantity may be set by rotating component 284 to a flow monitor volume, such flow volumes being marked at 288 in FIG. 11. Water then may flow unrestricted through access channel 260 into receiving cavity 262.

Although fluid treatment system 200 has been described using monitor 250, other monitoring devices, such as those described in U.S. Pat. Nos. 5,050,772 and 5,065,901 by Brane et al, referenced hereinabove, may be used.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. Apparatus for monitoring a flow of fluid through a conduit, comprising:

an outer housing having an input port and an output port, connectable with said conduit;

a gear housing within said outer housing, having a centrally disposed longitudinal axis, a top portion, and a bottom portion with a gear train output opening;

a reduction gear train positioned within said gear housing and including:

a first gear array extending along a first gear axis, a second gear array extending along a second gear axis, each said first and second gear axes being parallel with and spaced from said centrally disposed longitudinal axis, said first and second gear arrays being mounted for rotation about said first and second axes, respectively, and operatively meshed to define first to last gear reduction stages exhibiting a predetermined reduction ratio, an offset gear component rotatable about said first gear axis and meshed in driving relationship with said second gear array, and an output gear in driven relationship with said last gear reduction stage, extending from said gear train output opening, and having an axis of rotation spaced from said longitudinal axis;

a drive gear mounted for rotation adjacent said gear housing bottom portion having an engaging portion, engaged in driven relationship with said output gear, and having an oppositely disposed valve drive portion;

a turbine mounted adjacent to said gear housing top portion, rotatably drivable about said longitudinal axis by fluid incident thereon from said input port, and having an outwardly depending turbine gear meshed in driving relationship with said offset gear;

a valve seat within said outer housing adjacent said output port and including an open valve portion and a valve close portion;

a valve member mounted within said outer housing adjacent said drive gear, having an upwardly disposed engaging component engageable in driven relationship with said drive gear valve drive portion, and having a valve actuating portion extending from said upwardly disposed engaging component and movable with respect to said open valve portion to provide an open valve orientation to permit fluid flow through said output port and movable with respect to said valve close portion to provide a closed valve orientation to effect blockage of fluid flow through said output port; and a reset assembly actuable to effect positioning said valve member actuating portion to provide said open valve orientation for permitting the flow therethrough of a predetermined quantity of fluid.

2. The apparatus of claim 1 in which said gear housing top portion includes a turbine support component extending inwardly adjacent said offset gear component and having a lower turbine shaft pivot symmetrically disposed about said longitudinal axis; and said turbine gear is rotatably mounted upon said turbine shaft pivot.

3. The apparatus of claim 2 in which:

said turbine support component extends from a beating aperture formed within said top portion symmetrically about said longitudinal axis, and said turbine gear is supportably rotatable within said bearing aperture when said turbine is mounted adjacent said gear housing top portion.

4. The apparatus of claim 3 in which:

said lower turbine shaft pivot is an upstanding generally cylindrically shaped pin; and said turbine gear includes an inwardly depending cylindrical bearing cavity rotatably mountable over said upstanding pin.

5. The apparatus of claim 3 in which said turbine support component is a downwardly depending cylinder integrally formed with said gear housing top portion and having a longitudinally disposed opening formed therein for receiving the tooth containing periphery of said offset gear component.

6. The apparatus of claim 1 in which:

said outer housing includes a cap portion incorporating said input port in an orientation for effecting a fluid rotational drive of said turbine and having an upper turbine shaft pivot symmetrically disposed about said longitudinal axis; and said turbine includes an upwardly disposed bearing component in rotatable engagement with said upper turbine shaft pivot.

7. The apparatus of claim 6 in which:

said upper turbine shaft pivot is a downwardly depending cylindrical shaft; and said turbine upwardly disposed bearing component is an upwardly extending open cylinder having an internal beating cavity of diameter slidably receiving said cylindrical shaft for rotation thereabout.

8. The apparatus of claim 1 in which:

said gear housing top portion includes a turbine support component extending inwardly adjacent said offset gear component and having a lower turbine shaft pivot symmetrically disposed about said longitudinal axis;

said outer housing includes a cap portion incorporating said input port in an orientation for effecting a fluid rotational drive of said turbine and having an upper turbine shaft pivot symmetrically disposed about said longitudinal axis; and said turbine includes an upwardly disposed bearing component in rotatable engagement with said upper turbine shaft pivot.

9. The apparatus of claim 1 in which:

said drive gear valve drive portion comprises an array of radially disposed ratchet teeth;

said upwardly disposed engaging component is configured as a disk comprising at least two outwardly disposed resilient pawls engageable in driven relationship in a first rotational direction with said ratchet teeth and movable in an opposite resetting rotational direction by said reset assembly;

said valve seat open valve portion includes an open valve cam surface, and said valve close portion includes a valve closing detent portion;

said valve actuating portion includes a camming stem slidably movable upon said valve cam surface and engaged therewith under a bias provided by said engagement of said resilient pawls with said ratchet teeth, and movable under said bias within said valve seat closing detent portion to provide said closed valve orientation; and said drive gear engaging portion includes a ring with internally disposed teeth meshed with said output gear.

10. A system for treating fluid flowing along a fluid path, comprising:

a filter base assembly having a receiving and supporting region and an oppositely disposed service region;

a filter cover removably mounted upon said base assembly receiving and supporting region;

a filter located within said filter cover, having a support portion removably receivable and supportable upon said filter base assembly at said receiving and supporting region;

a flow monitor for determining the flow of a predetermined quantity of said fluid along said path, including:

a housing mounted at said filter base assembly service region, having an input port for receiving fluid from said fluid path and an output port for returning said received fluid to said path, a reduction gear train positioned within said housing and having first to last gear reduction stages exhibiting a predetermined reduction ratio, a turbine mounted within said housing adjacent said input port, rotatably drivable by fluid incident thereon from said input port and coupled in driving relationship with said first gear reduction stage, a valve seat within said housing and including an open valve portion and a valve close portion, and a valve assembly mounted within said housing, having a drive component engaged in driven relationship with said last gear reduction stage, a valve member coupled in driven relationship with said drive component to move from a reset orientation on said valve seat open portion to a closed valve orientation at said valve close portion, said drive component including a ratchet assembly coupled to provide a rotatable driven relationship within said valve member first rotational sense and rotatable in an opposite sense by an applied reset force, said valve member being resiliently biased toward said valve seat, being movable under said bias from said reset orientation to said closed valve orientation to block fluid along said fluid path, and being rotatable between said reset orientation and said closed valve orientation, and said valve assembly having a reset component engageable to reposition said valve member to said reset orientation by moving it against said bias and applying said reset force thereon; and an access channel extending through said filter base assembly at said receiving and supporting region adjacent said reset component for providing access from said receiving and supporting region to engage said reset component only when said filter is removed from said filter base assembly.

11. The system of claim 10 in which:

said flow monitor housing is formed substantially integrally with said filter base assembly; and said output port is in fluid flow communication with said access channel.

12. The system of claim 10 in which:

said flow monitor housing input port is coupled to receive fluid from said fluid path, and said output port is in fluid flow communication with said filter cover through said filter base assembly; and said base assembly includes a filter output port for transferring filtered fluid to said flow path.

13. The system of claim 10 in which said reset component extends into said access channel when said valve member is in said closed valve orientation, and being accessible for positioning said valve member to said reset orientation when said filter is removed from said filter base assembly.

14. Apparatus for monitoring a flow of fluid through a conduit, comprising:

an outer housing having an input port and an output port, connectable with said conduit;

a gear chamber within said outer housing having a centrally disposed longitudinal axis;

a reduction gear train positioned within said gear chamber and including:
a first gear array extending along a first gear axis,
a second gear array extending along a second gear axis,
said first and second gear arrays being mounted for rotation about said first and second axes, respectively, and operatively meshed to derive a predetermined reduction ratio, and
an output gear extending from and in driven relationship with said gear train;

a drive gear mounted for rotation adjacent said output gear, having an engaging portion meshed in driven relationship with said output gear, and an oppositely disposed valve drive portion comprising an array of radially disposed ratchet teeth;

a turbine rotatably drivable about said longitudinal axis by fluid incident thereon from said input port, and meshed in driving relationship with said gear train;

a valve seat within said outer housing adjacent said output port and including an open valve portion and a valve close portion;

a valve member mounted within said outer housing adjacent said drive gear, having an upwardly disposed engaging component comprising at least two outwardly disposed resilient pawls engageable in driven relationship with said drive gear ratchet teeth for movement in a first rotational direction and movable in an opposite resetting rotational direction to effect a ratchet defining coupling, and having a valve actuating portion extending outwardly from and rotatable with said engaging component for movement with respect to said open valve portion to provide an open valve orientation permitting fluid flow through said output port and movable to a said valve close portion to provide a closed valve orientation to effect blockage of fluid flow through said output port; and a reset assembly actuable to move said engaging component in said resetting rotational direction to effect positioning said valve member actuating portion to provide said open valve orientation for permitting the flow therethrough of a predetermined quantity of fluid.

15. The apparatus of claim 14 in which said upwardly disposed engaging component is configured as a disk, and said resilient pawls are formed integrally therewith.

16. The apparatus of claim 14 in which:

said valve seat open valve portion includes an open valve cam surface, and said valve close portion includes a valve closing detent portion; and said valve actuating portion includes a camming stem slidably movable upon said valve cam surface and engaged therewith under a bias provided by said engagement of said resilient pawls with said ratchet teeth, and movable under said bias within said valve seat closing detent portion to provide said closed valve orientation.

17. Apparatus for monitoring a flow of fluid through a conduit, comprising:

an outer housing having an input port and an output port, connectable with said conduit;

a gear chamber within said outer housing having a centrally disposed longitudinal axis;

a reduction gear train positioned within said gear chamber and including:
a first gear array extending along a first gear axis,
a second gear array extending along a second gear axis,
said first and second gear arrays being mounted for rotation about said first and second axes, respectively, and operatively meshed to derive a predetermined reduction ratio, and
an output gear extending from and in driven relationship with said gear train;

a drive gear mounted for rotation adjacent said output gear, having an engaging portion including a ring with internally disposed teeth meshed in driven relationship with said output gear, and an oppositely disposed valve drive portion;

a turbine rotatably drivable about said longitudinal axis by fluid incident thereon from said input port, and meshed in driving relationship with said gear train;

a valve seat within said outer housing adjacent said output port and including an open valve portion and a valve close portion;

a valve member mounted within said outer housing adjacent said drive gear, having an upwardly disposed engaging component rotatably engageable in driven relationship with said drive gear valve drive portion to effect a ratchet defining coupling, and having a valve actuating portion extending outwardly from and rotatable with said engaging component for movement with respect to said open valve portion to provide an open valve orientation permitting fluid flow through said output port and movable to a said valve close portion to provide a closed valve orientation to effect blockage of fluid flow through said output port; and a reset assembly actuable to effect positioning said valve member actuating portion to provide said open valve orientation for permitting the flow therethrough of a predetermined quantity of fluid.

* * * * *